Dec. 3, 1957     G. H. MULLER ET AL     2,815,099

SHOCK ABSORBER

Filed Dec. 31, 1954     2 Sheets-Sheet 1

G. H. MULLER,
J. G. McQUAID,
INVENTOR.

BY E. C. McRae,
J. R. Faulkner,
J. H. Oster,
ATTORNEYS.

Dec. 3, 1957 G. H. MULLER ET AL 2,815,099
SHOCK ABSORBER
Filed Dec. 31, 1954 2 Sheets-Sheet 2
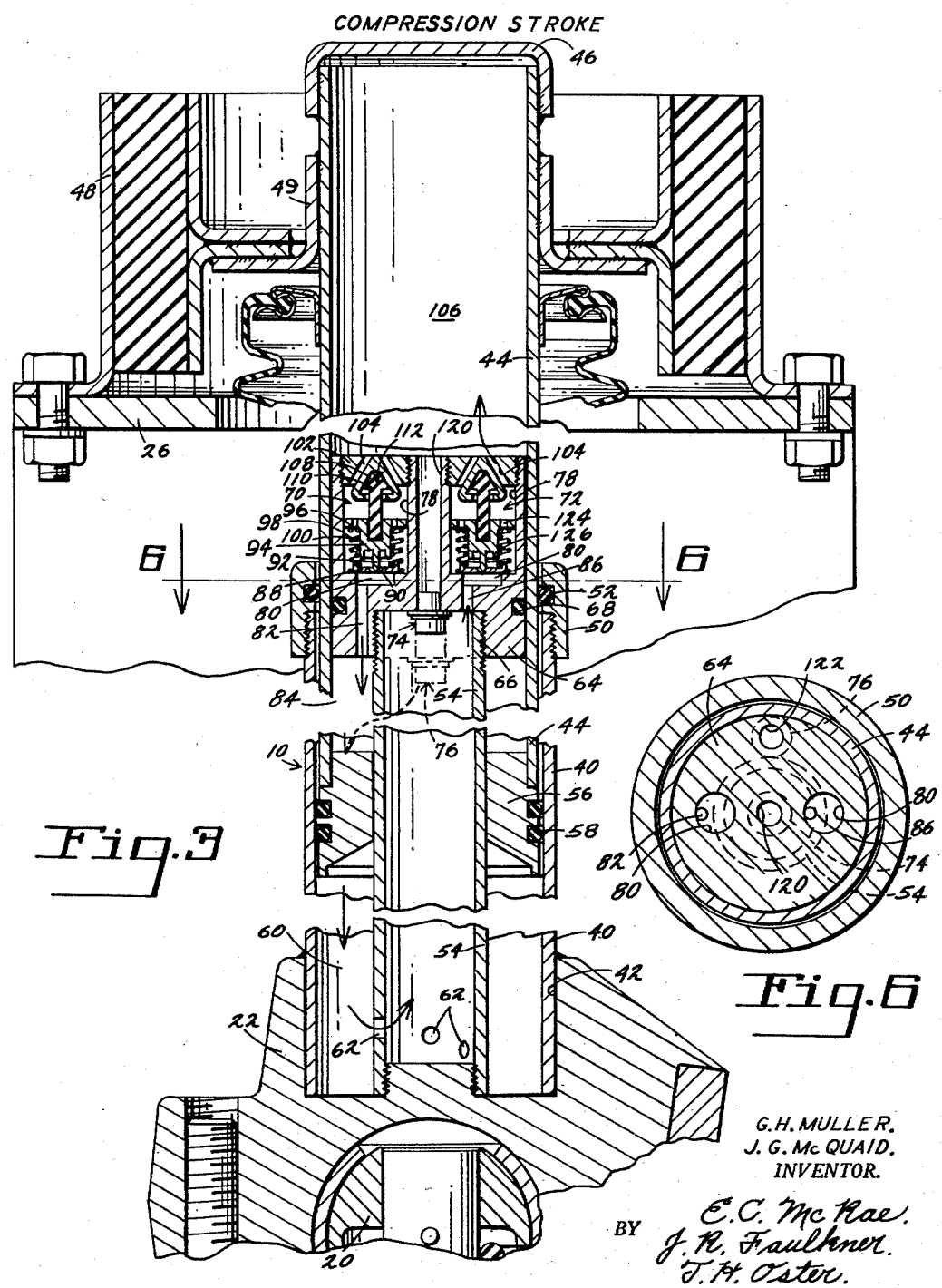
G. H. MULLER,
J. G. McQUAID,
INVENTOR.
BY E. C. McRae,
J. R. Faulkner,
T. H. Oster.
ATTORNEYS.

United States Patent Office 2,815,099
Patented Dec. 3, 1957

2,815,099

SHOCK ABSORBER

George H. Muller, Northville, and John G. McQuaid, Detroit, Mich., assignors to Ford Motor Company, Dearborn, Mich., a corporation of Delaware Application December 31, 1954, Serial No. 479,181

5 Claims. (Cl. 188—88)

This invention relates generally to motor vehicles, and particularly to a combined hydraulic shock absorber and telescopic control member for an independently suspended road wheel of a motor vehicle.

In some types of independent wheel suspensions for motor vehicles a shock absorber is utilized which not only performs its normal damping functions but also serves as a telescopic control member assisting the suspension in supporting and guiding the road wheel. The present invention relates to such a combined tubular type hydraulic shock absorber and telescopic control member which is so constructed as to provide considerable resistance to the bending stresses induced in the shock absorber by accelerating and braking forces and also by wheel side thrust. This is accomplished by replacing the relatively flexible small diameter solid rod of a conventional telescopic shock absorber by a large diameter tube. Simplicity of construction and operation is achieved by mounting all of the control valves in a single valve block carried at the upper end of a central tube connected to an unsprung member of the vehicle and located concentrically within a lower cylinder also connected to the unsprung member. An upper cylinder is connected to a sprung member of the vehicle and carries at its lower end an annular piston reciprocable within the annular space between the lower cylinder and the central tube. Openings are provided in a lower portion of the central tube to establish communication between the central tube and the lower portion of the lower cylinder beneath the annular piston, thus providing an automatic hydraulic cut-off or block to limit extreme telescopic movement of the upper and lower shock absorber cylinders toward each other. Another advantage of this construction resides in the fact that the portion of the upper cylinder located above the valve block forms the reservoir chamber for reserve fluid, and since this can in effect be considered part of the sprung mass of the vehicle the unsprung mass is considerably reduced, contributing to more desirable ride characteristics.

Other objects and advantages of this invention will be made more apparent as this description proceeds, particularly when considered in connection with the accompanying drawings, wherein:

Figure 3 is an enlarged vertical cross sectional view taken substantially on the plane indicated by the line 3—3 of Figure 1, and showing the shock absorber during its compression stroke.

Figure 6 is an enlarged horizontal cross sectional view taken substantially on the plane indicated by the line 6—6 of Figure 3.

Figure 1:
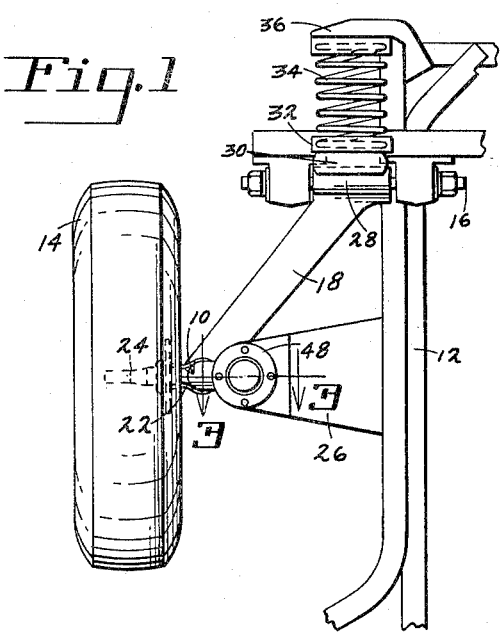
Figure 1 is a fragmentary plan view of the forward portion of a motor vehicle chassis incorporating a combined shock absorber and telescopic control member constructed according to the present invention.
Figure 2:
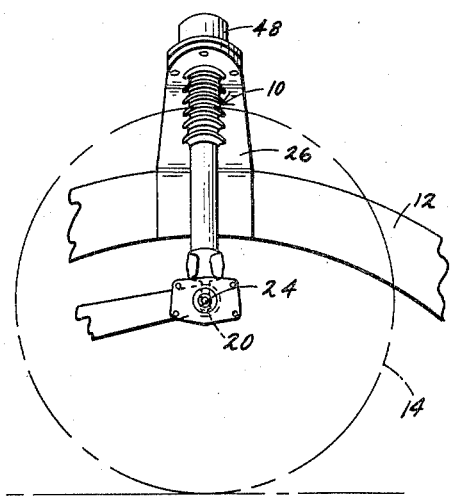
Figure 2 is a fragmentary side elevational view of the construction showed in Figure 1.

Referring now to the drawings, it will be seen that the combined hydraulic shock absorber and telescopic control member 10 is shown as part of a vehicle suspension system of the type shown in the patent application filed concurrently herewith in the name of George H. Muller entitled "Independent Front Wheel Suspension for Motor Vehicles," Serial No. 486,498, now Patent Number 2,768,-001, and having a common assignee with the present application.

The reference character 12 in Figure 1 indicates the frame of a motor vehicle chassis having front road wheels 14. Pivotally supported upon the forward portion of the frame 12 for rotation about horizontal transversely extending pivot shafts 16 are a pair of suspension arms 18 of the trailing arm type. Each trailing suspension arm 18 is connected at its rearward end by means of a ball joint 20 to a spindle support 22 having a spindle portion 24 rotatably supporting the road wheel 14. A telescopic tubular shock absorber 10 is supported at its lower end upon each spindle support 22 and is pivotally connected at its upper end to a frame member 26. Thus it will be seen that the trailing suspension arms 18 and the shock absorbers 10 cooperate to support and guide the road wheels 14 during their rising and falling movements with respect to the vehicle frame.

Each suspension arm 18 is provided with an integral vertical flange 28 extending upwardly from the hub of the suspension arm and acting, through a rubber block 30 and spring retainer 32 upon a suspension coil spring 34. The coil spring 34 extends generally horizontally and longitudinally of the vehicle and at its forward end is held in a spring retainer 36 in the form of a bracket rigidly secured to the forward portion of the vehicle frame 12.

The above described wheel suspension is shown for the purpose of illustration, but it will be understood that the shock absorber of the present invention may be used with other types of wheel suspension constructions as well.

Referring now to Figure 3, the shock absorber 10 comprises a lower cylinder 40 supported within and welded to a socket 42 in the spindle support 22. Telescopically received within the lower cylinder 40 is an upper cylinder 44 closed at its upper end by an end cap 46. The upper cylinder 44 is connected to the vehicle frame member 26 by means of a rubber mount 48 having a flange 49 welded to the cylinder. An end ring 50 is threadedly connected to the upper end of the lower cylinder 40 and carries a sealing ring 52 engageable with the upper cylinder 44.

Concentrically located within the lower cylinder 40 is a central tube 54 rigidly connected at its lower end to the spindle support 22. Reciprocable within the annular space between the central tube 54 and the lower cylinder 40 is an annular piston 56 rigidly carried by the lower end of the upper cylinder 44. A pair of sealing rings 58 are carried by the annular piston 56 for engagement with the inner surface of the lower cylinder 40.

An annular chamber 60 is thus formed between the lower cylinder 40 and the central tube 54 beneath the annular piston 56, and this chamber is placed in communication with the interior of the central tube 54 by means of a series of openings 62 in the wall of the central tube 54 adjacent its lower end.

A valve block 64 is reciprocable within the upper cylinder 44 and is carried by the upper end of the central tube 54. The valve block has a central threaded bore 66 threadedly receiving the upper end of the central tube 54. A sealing ring 68 is carried in an annular groove in the valve block and engages the inner wall of the upper cylinder 44. The valve block 64 carries a pair of control valves 70 and 72 and a pair of check valves 74 and 76.

The control valves 70 and 72 are basically identical and are located diametrically on opposite sides of the axis of the valve block. Each control valve is housed within a cylindrical bore 78 formed in the valve block and communicating with a cylindrical cavity 80 directly therebeneath. The cavity 80 for the control valve 70 communicates by means of an axially extending passageway 82 with the annular chamber 84 formed between the upper cylinder 44 and the central tube 54 and located between the valve block 64 and the annular piston 56. The cylindrical cavity 80 for the control valve 72 communicates by means of a short passageway 86 with the upper portion of the central tube 54, and thus communicates, through the ports 62 in the lower end of the central tube, with the annual chamber 60 beneath the piston 56.

Since the control valves 70 and 72 are basically identical, only the control valve 70 will be described in detail. A valve disc 88 having a diameter slightly larger than the diameter of the cylindrical cavity 80 in the valve block normally rests upon the bottom of the cylindrical bore 78 in the valve block concentric with the opening 80. The disc 88 is provided with a central tapered orifice 90 forming a valve seat. Arranged to control the orifice 90 is a needle valve 92 formed integrally with a valve body 94 having an upper flange 96 slidably mounted within the bore 78 in the valve block. An inner coil spring 98 is assembled between the upper flange 96 of the valve body 94 and the valve disc 88 and functions to normally hold the valve disc upon its seat on the lower wall of the bore 78. An outer coil spring 100 is assembled between the upper flange 96 of the valve body 94 and the bottom wall of the cylindrical bore 78 in the valve block and normally urges the valve body upwardly in the bore.

The upper end of the cylindrical bore 78 in the valve block is closed by an end member 102 threadedly received within the bore. A circumferential series of diagonal passageways 104 provide communication between the interior of the cylindrical bore 78 in the valve block and the reservoir chamber 106 formed in the upper cylinder 44 above the valve block. The end member 102 is formed with a central cavity 108 receiving the head 110 of a thermostatic element 112 formed of an expansible material such as plastic so as to be expansible in a predetermined manner in accordance with temperature increases. The thermostatic element 112 has a shank 114 extending into a bore formed in the valve body 94. It will be seen that upon a temperature increase the length of the thermostatic element 112 increases forcing the valve body 94 downwardly against the outer coil spring 100 to cause the needle valve 92 formed integrally therewith to penetrate the orifice 90 in the valve disc 88.

The needle valve 92 has a tapered end and cooperates with the tapered orifice 90 to vary the effective opening through the valve disc 88 dependent upon the position of the needle valve 92 with respect thereto, the latter in turn being dependent upon the temperature to which the thermostatic element 112 is subjected. As the temperature increases and the viscosity of the oil decreases the orifice in the valve disc 88 is automatically decreased so as to provide a more uniform control for the shock absorber mechanism regardless of temperature. Conversely, a decrease in temperature accompanied by increased viscosity of the oil increases the effective orifice through the valve disc 88, the outer coil spring 100 raising the valve body 94 as the thermostatic element 112 contracts.

An axial passageway 120 is formed concentrically within the valve block 64 and is controlled by the check valve 74 at its lower end. The check valve is adapted to be opened by a downward movement against spring pressure to permit oil passage from the reservoir chamber 106 to the interior of the central tube 54, but to prevent oil passage in the opposite direction.

A similar downwardly opening check valve 76 is provided at the bottom of an axially extending passageway 122 in the valve block 64. As seen in Figure 6, the passageway 122 is offset from the axis of the shock absorber and is in vertical alignment with the annular space 84 between the upper cylinder 44 and the central tube 54 to provide for the passage of fluid from the reservoir chamber 106 to the annular chamber 84 beneath the valve block. The check valve 76 prevents passage of oil from the opposite direction.

During the compression stroke of the shock absorber, as during jounce of the road wheel 14, the lower cylinder 40 and the central tube 54, together with the valve block 64 carried thereby, are moved upwardly with respect to the upper cylinder 44. Fluid under pressure is forced from the annular chamber 60 beneath the piston 56 through the port 62 in the wall of the central tube 54 and through the central tube to the passageway 86 in the valve block leading to the cylindrical cavity 80 for the control valve 72. The fluid is then forced through the orifice 90 in the valve disc 88, the effective opening of which is controlled by the needle valve 92 in accordance with the temperature responsive thermostatic element 112. The fluid then passes through ports 124 in the upper plate 96 of the valve body 94 and through the passageways 104 in the end member 102 to the reservoir chamber 106.

Figure 4:
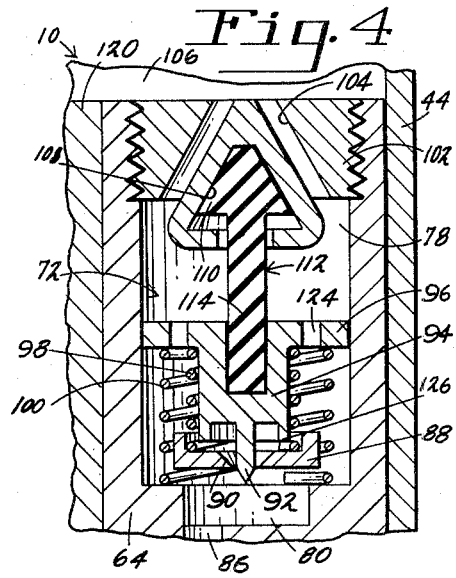
Figure 4 is an enlarged fragmentary cross sectional view of a portion of the valve mechanism shown in Figure 3, with the valve in a slightly different position.

In the event of extreme pressures the valve disc 88 can of course be lifted from its seat against the action of the inner coil spring 98 to provide an opening between the valve disc and the cylindrical cavity 80 to permit the passage of the greater quantity of fluid. As seen in Figure 4, upward movement of the valve disc 88 under these conditions is limited by eventual engagement of the valve disc 88 with an annular rib 126 depending from the hub portion of the valve body 94. The upward travel of the valve disc 88 during blow off thus is dependent upon temperature conditions, since the valve body 94 is vertically positioned within the cylindrical bore 78 of the valve block in accordance with the length of the thermostatic element 112. Thus, during high temperature conditions the valve body will be moved downwardly and the annular rib 126 placed closer to the valve disc 88 so that the blow off will provide a more restricted communication around the valve disc. On the other hand, under cold conditions the valve body 94 will be located higher in the valve block and the valve disc 88 will be permitted a greater upward travel. In addition, the movement of the valve body 94 in accordance with temperature variations results in varying the load upon the blow off valve spring 98.

Referring again to Figure 3, during the compression stroke fluid from the reservoir 106 passes through the control valve 70 and the passageway 82 to replenish the annular chamber 84 between the valve block 64 and the piston 56 since this chamber is increasing in size during the compression stroke. In the event the fluid flow permitted through the valve 70 is insufficient to completely fill the chamber 84 additional fluid from the reservoir 106 may be drawn through the check valve 76. The check valve 74 is of course held closed during the compression stroke since the interior of the central tube 54 is under pressure.

Figure 5:
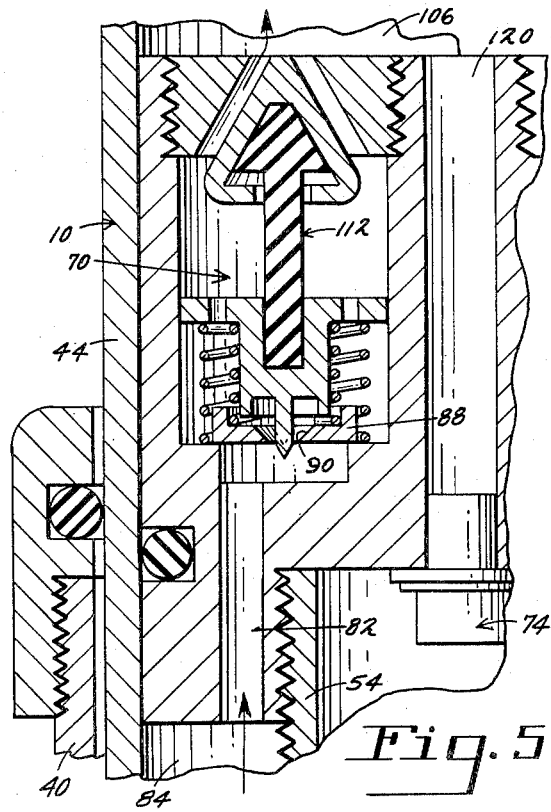
Figure 5 is a cross sectional view similar to Figure 3 but showing the shock absorber in its rebound stroke.

Figure 5 illustrates the rebound stroke of the shock absorber 10, at which time the lower cylinder 40 and central tube 54 are moved downwardly relative to the upper cylinder 44 and annular piston 56 to apply pressure to the fluid within the annular chamber 84 and to force this fluid through the passageway 82 and control valve 70 into the reservoir 106. Here again the tapered orifice 90 in the valve disc 88 and the load on spring 98 are controlled by the temperature responsive thermostatic element 112 and the amount of blow off of the valve disc 88 is also limited by the position of the valve body 94 which is likewise determined by the temperature responsive element 112. During the rebound stroke the check valve 76 is closed by the pressure in the annular chamber 84.

Thus, it will be seen that these things are automatically varied with temperature variations, namely the orifice, the blow off spring load, and the restriction after blow off.

The annular chamber 60 beneath the piston 56 increases in volume during the rebound stroke and replenishment is effected from the reservoir 106 through the control valve 72 and passageway 86 to the interior of the central tube 54 and then through the ports 62 to the chamber 60. If necessary, additional fluid is transferred from the reservoir 106 through the check valve 74 to the central tube and the annular chamber 60.

Under normal compression and rebound strokes the ports 62 at the bottom of the central tube 54 are open to establish communication between the central tube and the annular chamber 60. During extreme upward movement of the road wheel 14, however, the compression stroke of the shock absorber may be limited by cutting off the flow of fluid through the ports 62. This is accomplished when the piston 56 covers the ports 62 and provides a hydraulic stop limiting further movement of the shock absorber parts relative to each other. A graduated cut off is obtained by the progressive covering of the parts 62 which are of varying sizes and locations.

The sliding movement between the upper and lower cylinders 44 and 40, piston 56, central tube 54, and valve block 64 provides a telescopic assembly sufficiently strong and rigid to resist the bending stresses to which it is subjected in a suspension of the type shown in Figure 1 in which the shock absorber carries all of the accelerating and braking forces as well as side wheel thrust. Simplicity is achieved by mounting all of the valves in a single valve block, and the arrangement permits the location of the reservoir above the valve block thus decreasing the unsprung mass and materially improving riding characteristics.

Although shown incorporated in a shock absorber of this type, it will be understood that the valve block arrangement and the thermostatic control construction could be incorporated in other types of shock absorbers as well.

It will be understood that the invention is not to be limited to the exact construction shown and described, but that various changes and modifications may be made without departing from the spirit and scope of the invention, as defined in the appended claims.

What is claimed is:

1. A combined hydraulic shock absorber and telescopic control member for a road wheel of a motor vehicle having a sprung member and an unsprung member, comprising a lower cylinder adapted to be connected to said unsprung member, an upper cylinder adapted to be connected to said sprung member and telescopically received within said lower cylinder, a central tube carried by said lower cylinder concentrically therein, an annular piston carried by the lower end of said upper cylinder and reciprocable within the annular chamber between said lower cylinder and said central tube, said central tube having an opening therein beneath the normal position of said piston and providing communication between said annular chamber and the interior of said tube, a valve block carried by said tube at the upper end thereof and reciprocable within said upper cylinder and dividing said upper cylinder into an annular chamber beneath said valve block and a reservoir chamber above said valve body, a pair of restricted passageways in said valve block one establishing restricted communication between said reservoir chamber and the annular chamber in said upper cylinder and the other establishing restricted communication between said reservoir chamber and said central tube, a pair of check valves in said valve block one establishing on way communication from said reservoir chamber to the annular chamber in said upper cylinder and the other establishing one way communication from said reservoir chamber to said central tube, said one check valve being located in an axially extending passageway through said valve block radially offset from the axis of said valve block sufficiently to place it in alignment with the annular chamber in said upper cylinder, said other check valve being located in an axially extending passageway in said valve block concentric with the axis thereof to place it in alignment with said inner tube, and said two restricted passageways through said valve block being located on opposite sides of the axis thereof.

2. A combined hydraulic shock absorber and telescopic control member for a road wheel of a motor vehicle having a sprung member and an unsprung member, comprising a lower cylinder adapted to be connected to said unsprung member, an upper cylinder adapted to be connected to said sprung member and telescopically received within said lower cylinder, a central tube carried by said lower cylinder concentrically therein, an annular piston carried by the lower end of said upper cylinder and reciprocable within the annular chamber between said lower cylinder and said central tube, said central tube having an opening therein beneath the normal position of said piston and providing communication between said annular chamber and the interior of said tube, a valve block carried by said tube at the upper end thereof and reciprocable within said upper cylinder and dividing said upper cylinder into an annular chamber beneath said valve block and a reservoir chamber above said valve body, a pair of restricted passageways in said valve block one establishing restricted communication between said reservoir chamber and the annular chamber in said upper cylinder and the other establishing restricted communication between said reservoir chamber and said central tube, a pair of check valves in said valve block one establishing one way communication from said reservoir chamber to the annular chamber in said upper cylinder and the other establishing one way communication from said reservoir chamber to said central tube, said pair of restricted passageways in said block comprising upwardly opening cylindrical bores formed in said valve body symmetrically on opposite sides of the axis thereof and opening toward said reservoir chamber, a passageway extending through the lower portion of said valve block and establishing communication between the bottom of one of said cylindrical bores and the annular chamber in said upper cylinder, a second passageway in a lower portion of said valve block establishing communication between the other of said cylindrical bores and the interior of said inner tube, a spring urged valve plate in each of said cylindrical bores covering the upper ends of said last mentioned passageways, said valve plates having openings therein, and valve plungers in said cylindrical bores restricting the openings in said valve plates.

3. A combined hydraulic shock absorber and telescopic control member for a road wheel of a motor vehicle having a sprung member and an unsprung member, comprising a lower cylinder adapted to be connected to said unsprung member, an upper cylinder adapted to be connected to said sprung member and telescopically received within said lower cylinder, a central tube carried by said lower cylinder concentrically therein, an annular piston carried by the lower end of said upper cylinder and reciprocable within the annular chamber between said lower cylinder and said central tube, said central tube having an opening therein beneath the normal position of said piston and providing communication between said annular chamber and the interior of said tube, a valve block carried by said tube at the upper end thereof and reciprocable within said upper cylinder and dividing said upper cylinder into an annular chamber beneath said valve block and a reservoir chamber above said valve body, a pair of restricted passageways in said valve block one establishing restricted communication between said reservoir chamber and the annular chamber in said upper cylinder and the other establishing restricted communication between said reservoir chamber and said central tube, a pair of check valves in said valve block one establishing one way communication from said reservoir chamber to the annular chamber in said upper cylinder and the other establishing one way communication from said reservoir chamber to said central tube, the opening in said inner tube being located adjacent the lower end thereof and during all normal telescopic movement of the upper and lower cylinders provides for the passage of fluid from the annular chamber in the lower cylinder beneath said piston to the interior of the tube and thence to said reservoir chamber through the restricted passageway in said valve block, said opening however being in the path of abnormal movement of said cylinders toward each other to be covered by said piston to cut off communication between the annular chamber and lower portion of said lower cylinder and said inner tube to provide a hydraulic stop for the compression stroke of said shock absorber.

4. A combined hydraulic shock absorber and telescopic control member for a road wheel of a motor vehicle having a sprung member and an unsprung member, comprising a lower cylinder adapted to be connected to said unsprung member, an upper cylinder adapted to be connected to said sprung member and telescopically received within said lower cylinder, a central tube carried by said lower cylinder concentrically therein, an annular piston carried by the lower end of said upper cylinder and reciprocable within the annular chamber between said lower cylinder and said central tube, said central tube having an opening therein beneath the normal position of said piston and providing communication between said annular chamber and the interior of said tube, a valve block carried by said tube at the upper end thereof and reciprocable within said upper cylinder and dividing said upper cylinder into an annular chamber beneath said valve block and a reservoir chamber above said valve body, a pair of restricted passageways in said valve block one establishing restricted communication between said reservoir chamber and the annular chamber in said upper cylinder and the other establishing restricted communication between said reservoir chamber and said central tube, a pair of chack valves in said valve block one establishing one way communication from said reservoir chamber to the annular chamber in said upper cylinder and the other establishing one way communication from said reservoir chamber to said central tube, said pair of restricted passageways and said block comprising temperature sensitive means to vary the flow through said restricted passageways, said temperature sensitive means progressively decreasing the opening in said passageways as the temperature increases.

5. The structure defined in claim 4 which is further characterized by said temperature sensitive means comprising a thermostatic element having one end attached relative to said valve block and having the other end attached to a tapered needle valve which cooperates with a tapered orifice so that upon expansion of said element said needle valve will be urged into said orifice thereby restricting the flow there through, the end of said element attached to said block being conical in shape to further increase its sensitivity to temperature.

References Cited in the file of this patent

UNITED STATES PATENTS

| 1,792,695 | Lewis | Feb. 17, 1931 |
| 1,829,430 | Yevseyeff | Oct. 27, 1931 |
| 2,171,827 | Elliott | Sept. 5, 1939 |

FOREIGN PATENTS

| 315,917 | Great Britain | July 22, 1929 |
| 492,751 | Great Britain | Aug. 25, 1937 |
| 556,148 | Great Britain | Sept. 22, 1943 |